Feb. 10, 1931.  K. E. PEILER  1,791,634
METHOD OF AND APPARATUS FOR FEEDING MOLTEN GLASS
Filed June 10, 1926
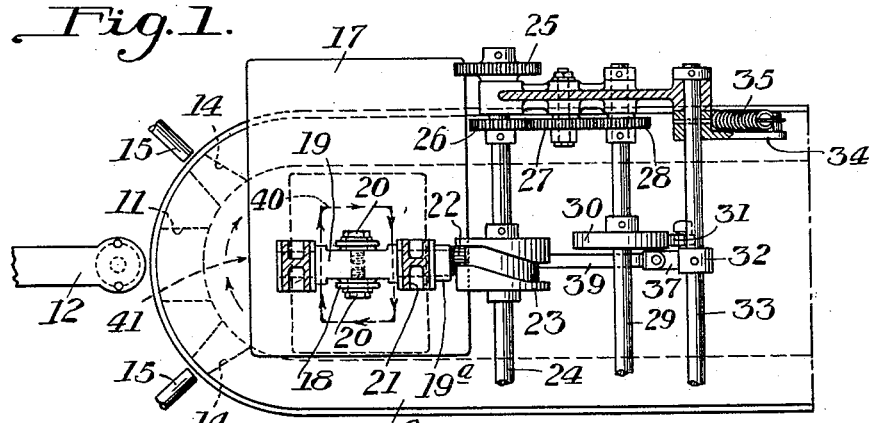
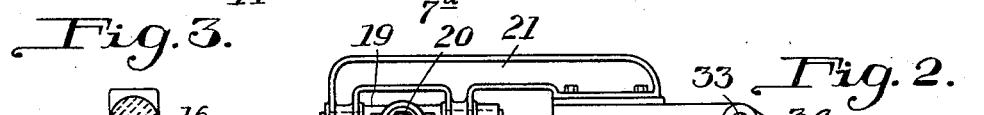
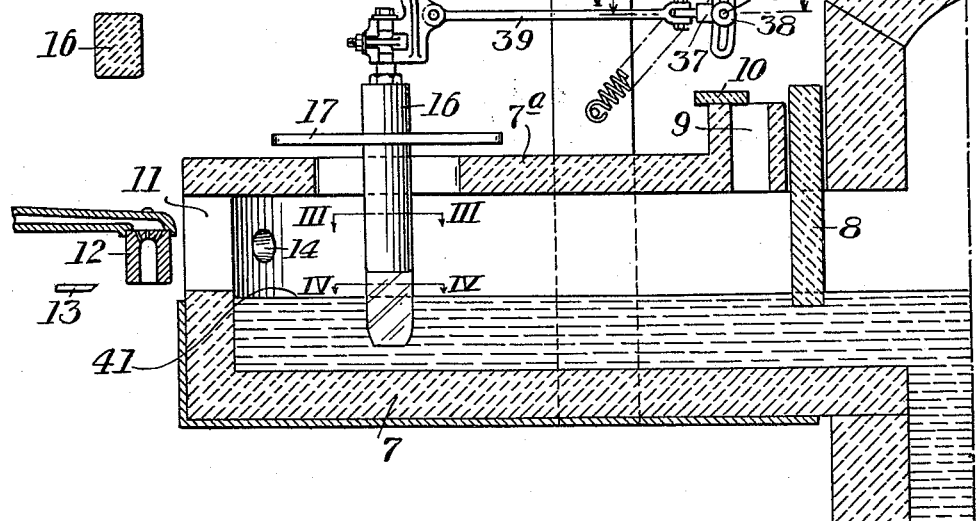
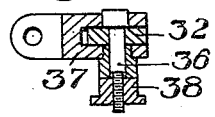
INVENTOR
KARL E. PEILER
BY Robson D. Brown
Attorney Patented Feb. 10, 1931

1,791,634

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

METHOD OF AND APPARATUS FOR FEEDING MOLTEN GLASS

Application filed June 10, 1926. Serial No. 114,881.

My invention relates to a method and apparatus for feeding mold charges of molten glass by gathering from the surface of a body of molten glass contained in a gathering pool or forehearth. It is particularly adapted for use in connection with glass gathering devices employing a gathering receptacle, transfer cup or mold which is filled by suction from the surface of a pool.

When a mold charge of molten glass is gathered from a pool of glass by a suction gatherer, or by similar means, the surface of the glass at the gathering station is chilled by contact with the relatively cold gathering means and with such shearing means as are employed to sever the mold charge from the body of glass in the pool. The surface of the glass at the gathering station is also chilled by the exposure caused by the opening which is needed for entrance of the gathering means. These chilled portions of glass would ordinarily be gathered up by the gathering means in gathering subsequent charges, causing defects or blemishes in the charge, which would appear as defects in ware made therefrom. The chill would also interfere with subsequent gathering operations and might even prevent gathering.

My invention has for its object the removal of the chilled surface of glass from the gathering station and the replacing of such chilled glass with hot glass, by causing a circulation or movement of glass, and particularly of the surface glass, past the gathering station, in a gathering pool or forehearth of proper proportion and with proper temperature regulating means. A further object is the reheating of the chilled glass by subjecting it to a suitable environment. Still another object is to provide a suitable gathering pool or forehearth from which mold charges may be gathered. These and other objects will be apparent from the following description.

The present invention is characterized by the use of an implement moving in a horizontal orbital path, as an agent for moving hot glass past the gathering station. Other implements having somewhat similar movements are shown in my copending applications for Letters Patent Serial Numbers 114,882 and 114,883, both filed on the same day as the present application, and Serial No. 114,089, filed June 7, 1926.

One means by which my invention may be practiced is shown in the accompanying drawing, wherein Figure 1 is a plan view of the apparatus, with parts in section; Fig. 2 is a longitudinal central sectional view of the apparatus of Fig. 1; Fig. 3 is a sectional view taken on the line III—III of Fig. 2; Fig. 4 is a sectional view taken on the line IV—IV of Fig. 2, and Fig. 5 is a sectional view on the line V—V of Fig. 2.

A portion of a glass melting furnace is indicated at 6, and is provided with a forehearth 7 of proper proportions and construction for supplying molten glass in suitable quantity and condition. A partition or gate 8 having its lower end immersed in the glass, is employed to seal off the forehearth from the fire space in the furnace and to thereby prevent the furnace draft from interfering with draft conditions in the forehearth. Openings 14 are provided in the end wall of the forehearth, through which flames from burners 15 may be projected to heat the forehearth, and additional burners may be provided as desired. A stack 9 and a chamber 10 are provided for effecting the desired draft conditions in the forehearth.

The forehearth is provided with an opening 11 at its front end, through which a suction gatherer 12 may be inserted to gather glass at the point 41. This gatherer is provided with shearing means 13 to sever the gathered mass from the glass in the forehearth. The suction gatherer and the shear are shown somewhat diagrammatically, since they may be manipulated in any well-known manner, the gatherer being first projected horizontally into the forehearth over the gathering point 41 and then lowered into contact with the glass, after which suction is applied to the cavity of the gatherer to fill it with glass. The gatherer may then be raised and the shearing means operated to sever the glass, after which the gatherer may be withdrawn from the forehearth to a discharging position, where it may discharge in its gather or charge of glass into a forming mold.

The forehearth 7 is provided with a cover or roof 7a that has an opening through which extends a paddle 16 which is mounted and moved so that the center of its lower end describes a horizontal orbit 40. The paddle 16 carries a plate 17 that serves to partially close the opening in the roof and to retard radiation of heat from the glass in the forehearth.

The lower portion of the paddle 16 is preferably rectangular in cross section, as shown in Fig. 4, and the remaining portion thereof is preferably circular in cross section, as shown in Fig. 3. The paddle is supported upon an arm 18 that is bifurcated at its upper end, the bifurcations extending past opposite sides of a rock shaft 19 and being pivotally connected thereto by shouldered bolts 20, 20. The rock shaft 19 is journaled in a bearing bracket 21 and has a crank arm 19a secured to its rear end.

For the purpose of oscillating the crank arm 19a to swing the paddle 16 transversely of the forehearth, the lower end of the arm 19a carries a roller 22 that engages a cam slot in a barrel-cam 23. The cam 23 is secured to a shaft 24 that carries on its outer end a gear wheel 25, by means of which the shaft and the cam are driven from any suitable source of power.

In order to swing the paddle 16 longitudinally of the forehearth in the intervals between its lateral movements, a gear wheel 26 is secured to the shaft 24 and meshes with a second gear wheel 27 by means of which power is transmitted from the gear wheel 25 to a gear wheel 28. The cam 30 swings the paddle 16 longitudinally through engagement with a roller 31 that is journalled in a lever 32 secured to a rock shaft 33 which also carries a crank arm 34. A tension spring 35 is connected to the outer end of the crank arm 34 and exerts force thereon in a clockwise direction, thereby holding the cam roller 31 in contact with the cam 30.

The swinging lever 32 is connected to the paddle arm 18 by a connecting rod 39 having universal joint connections at each end so as to permit motion in different directions. In order to enable the rear end of the connecting rod 39 to be adjusted up and down on the lever 32 to vary the length of the longitudinal stroke of the paddle, the lower end of the lever 32 is provided with a curved slot through which a bolt 36 extends. A bifurcated swivel member 37 engages with the lever 32, as shown more clearly in Fig. 5, and is positioned adjustably in the slot by means of the bolt 36 and a nut 38.

The cam members 23 and 30 are properly shaped to swing the paddle transversely and longitudinally to the desired extent, and the operation of these cams is so timed as to move the lower end of the paddle in an orbital path such, for example, as the path indicated by the arrows 40 on Fig. 1. A movement is thereby set up in the pool of glass, causing glass to travel past the gathering station 41, in the direction indicated by the arrows, thus carrying chilled portions of the glass away from the gathering point and to the rear of the forehearth, where it becomes reheated and will be later advanced forwardly to the gathering point.

The details of construction shown and described herein may be modified as desired, within the scope of the appended claims.

I claim as my invention:

1. The method of feeding molten glass, which comprises withdrawing charges of glass from a pool and effecting circulatory movement of the glass in the pool by a member having an orbital movement in contact with the glass along a horizontally disposed endless path located adjacent to the point of withdrawal.

2. The method of feeding molten glass, which comprises withdrawing charges of glass from a pool and effecting circulation of the glass in the pool by a member swingable about a plurality of different axes so that a glass-engaging portion of said member is moved along a horizontally disposed path having portions that extend transversely and longitudinally of the pool.

3. The method of feeding molten glass, which comprises withdrawing charges of glass from a confined pool adjacent to one end thereof, and effecting circulatory movement of the glass in the pool by a member that is bodily movable in a horizontally disposed substantially rectangular path located adjacent to said end of the pool.

4. The method of circulating molten glass, which comprises imparting movement to a confined pool of glass by a member having an orbital movement in contact with the glass along a horizontally disposed endless path that is located adjacent to one edge of the pool.

5. Apparatus for feeding molten glass, comprising means for withdrawing mold charges from a pool of glass, an impeller extending into the glass, and means for swinging said impeller about a plurality of different horizontal axes so that the glass-engaging portion of the impeller is moved in a horizontally disposed endless path to effect circulation of the glass past the point of withdrawal.

6. Apparatus for feeding molten glass, comprising means for establishing a gathering pool of glass, an impeller, and means for imparting oscillatory movement to said impeller as a whole in transverse and longitudinal directions with respect to the pool of glass.

7. Apparatus for circulating molten glass, comprising an impeller dipping into the glass, means for causing substantially horizontal translational movement of the glass-engaging portion of said impeller in one direction, and means for causing substantially horizontal translational movement of the glass-engaging portion of said impeller in another direction that is transverse to the first-named direction of movement.

8. Apparatus for circulating molten glass, comprising an impeller, means for supporting the impeller on a horizontal axis, means for supporting the impeller on a second horizontal axis disposed transversely of the first-named axis, and means for imparting movements to said impeller about its axes.

9. Apparatus for circulating molten glass, comprising an impeller, a pivotal support for said impeller, means for oscillating the impeller about said support, a second pivotal support for said impeller, and means for oscillating the impeller about said second named support, the axes of said pivotal supports being disposed at an angle to one another.

10. Apparatus for circulating molten glass, comprising an impeller, a pivotal support for said impeller, a cam for oscillating said impeller about said support, a rock shaft carrying said support, and a cam for oscillating said rock shaft, the axes of the pivotal support and the rock shaft being disposed at an angle to one another.

11. Apparatus for circulating molten glass, comprising an impeller, a pivotal support for said impeller, a rock shaft upon which said support is mounted, and means for oscillating said rock shaft and said impeller upon its pivotal support, the axes of the pivotal support and the rock shaft being disposed at an angle to one another.

12. Apparatus for circulating molten glass, comprising an impeller, means for oscillating said impeller in one horizontal direction, means for oscillating the impeller in a horizontal direction that is transverse to the first-named direction, and means for varying the length of travel of said impeller in one path of oscillatory movement.

13. Apparatus for circulating molten glass, comprising an impeller, a pivotal supporting member for said impeller, a rock shaft carrying said pivotal support, a cam member for oscillating said rock shaft, a cam member for oscillating said impeller about its supporting member, a driving member for the first-named cam, and a driving connection between said driving member and the second named cam.

14. Apparatus for circulating molten glass, comprising an impeller, a vertically extending arm for supporting said impeller, a rock shaft, means for pivotally supporting said arm upon the rock shaft, on an axis disposed transversely of said shaft, means for oscillating said rock shaft, a second arm pivotally supported adjacent to its upper end, a link connection between the lower ends of said arms, and means for oscillating the second-named arm.

15. Apparatus for circulating molten glass, comprising an impeller, a vertically extending arm for supporting said impeller, a rock shaft, means for pivotally supporting said arm upon the rock shaft on an axis disposed transversely of said shaft, means for oscillating said rock shaft, a second arm pivotally supported adjacent to its upper end, a link connection between the lower ends of said arms, and means for oscillating the second-named arm, the said link being adjustable vertically of one of said arms.

16. Apparatus for circulating molten glass comprising an impeller, a pivotal supporting member for said impeller, a rock shaft connected to said supporting member and having its axis disposed at an angle with the axis of said member, a cam member for oscillating said rock shaft, a cam member for oscillating said supporting member about its axis, a driving member for the first named cam, and a driving connection between said driving member and the second named cam.

17. That improvement in the glass working art which comprises the steps of successively gathering glass from the surface of a pool of molten glass and mixing the glass in the pool by causing orbital movement in a path extending past the place at which the gathering was effected of the glass-engaging portion of an implement dipping continuously in the glass, and timing the movements of said implement past the gathering place to effect removal of chilled glass therefrom in the intervals between successive gathering operations.

18. That improvement in the glass working art which comprises the steps of successively gathering glass from the surface of a pool of molten glass and mixing the glass in the pool by causing orbital movement in an endless path extending past the place of gathering of the glass-engaging portion of an implement dipping continuously in the glass, and timing the movements of said implement past the gathering place to effect removal of chilled glass therefrom in the intervals between successive gathering operations.

19. The method of treating molten glass which comprises supplying glass from a melting tank to a container connected thereto to provide a pool of glass separate from the glass in said tank, and from the surface of which charges of glass are removed in a gathering zone, and circulating the glass in the container in an orbital polygonal path in a substantially horizontal plane and confined to the container, to remove chilled glass from the gathering zone.

20. Apparatus for feeding molten glass comprising a melting tank, a forehearth connected to said tank, a channel for conducting glass from the tank to the forehearth, a partition adjacent said channel and dipping in the glass for separating the space above the glass in the tank from the space above the glass in the forehearth, while permitting glass to flow from the tank to the forehearth, means for successively removing charges of glass from the surface of the pool in the forehearth in a gathering zone, and means comprising an implement which is moved in contact with the glass, for circulating the glass in the forehearth in an orbital polygonal path located in a substantially horizontal plane, and confined to the forhearth, to remove chilled glass from the gathering zone.

Signed at Hartford, Conn., this 7th day of June, 1926.

KARL E. PEILER.